United States Patent
Shan et al.

(10) Patent No.: US 8,787,689 B2
(45) Date of Patent: Jul. 22, 2014

(54) APPARATUS AND METHOD FOR CORRECTION OF DISTORTION IN DIGITAL IMAGE DATA

(75) Inventors: Jizhang Shan, Cupertino, CA (US); Chengyu Xiong, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 35 days.

(21) Appl. No.: 13/472,139

(22) Filed: May 15, 2012

(65) Prior Publication Data

US 2013/0308870 A1  Nov. 21, 2013

(51) Int. Cl.
*G06K 9/46* (2006.01)

(52) U.S. Cl.
USPC .............................................. 382/233

(58) Field of Classification Search
None
See application file for complete search history.

(56) References Cited

U.S. PATENT DOCUMENTS

| | | | |
|---|---|---|---|
| 6,134,613 A * | 10/2000 | Stephenson et al. | 710/313 |
| 6,791,616 B2 | 9/2004 | Tamaki et al. | |
| 7,362,917 B2 | 4/2008 | Fujimoto et al. | |
| 7,636,498 B2 * | 12/2009 | Furukawa et al. | 382/303 |
| 7,783,128 B2 | 8/2010 | Kurata et al. | |
| 7,881,563 B2 | 2/2011 | Mandy et al. | |
| 8,023,009 B2 | 9/2011 | Cho | |
| 2004/0151372 A1 * | 8/2004 | Reshetov et al. | 382/166 |
| 2007/0025636 A1 * | 2/2007 | Furukawa et al. | 382/275 |
| 2007/0110160 A1 * | 5/2007 | Wang et al. | 375/240.16 |
| 2009/0080770 A1 * | 3/2009 | Jiang et al. | 382/164 |

FOREIGN PATENT DOCUMENTS

WO  2010071647 A1  6/2010

* cited by examiner

*Primary Examiner* — Bhavesh Mehta
*Assistant Examiner* — Feng Niu
(74) *Attorney, Agent, or Firm* — Lathrop & Gage LLP (57) ABSTRACT

An apparatus and method for correcting for distortion in distorted digital data for a distorted image to produce corrected digital data for a corrected image partitions the distorted digital data into a plurality of distorted data blocks. Each distorted data block is separately encoded into an encoded distorted data block. A plurality of corrected regions of the corrected image is defined, each corrected region being associated with a respective corrected data block. For each corrected data block, a plurality of associated encoded distorted data blocks is identified, the plurality of associated encoded distorted data blocks is decoded into a respective plurality of associated decoded distorted data blocks, and corrected image data for the corrected data block are generated using the associated decoded distorted data blocks.

12 Claims, 5 Drawing Sheets

Fig. 1

PRIOR ART

Fig. 2

PRIOR ART

APPARATUS AND METHOD FOR CORRECTION OF DISTORTION IN DIGITAL IMAGE DATA

BACKGROUND

This disclosure relates to correction of distortion in data for digital images, and, more particularly, to an apparatus and method for correcting distortion in digital image data.

Digital imaging systems typically include one or more lenses and digital image sensors. The digital image sensors capture light from an object or scene being imaged through the lenses and process the light into electronic signals. The electronic signals are typically converted into digital signals which are representative of the light from the object or scene, and the digital signals are typically stored as digital image data in a semiconductor memory. Such digital imaging systems are commonly used in a variety of consumer, industrial and scientific applications to produce still images and/or video, including mobile telephones, digital still image and video cameras, webcams, and other such devices.

Modern image sensors are typically complementary metal oxide semiconductor (CMOS) image sensors or charge-coupled device (CCD) image sensors. The image sensors are typically arranged in a two-dimensional array of rows and columns of pixels. A typical modern digital image sensor can include millions of pixels to provide high-resolution images.

The quality of digital images, including still and video images, generated by an image sensor device can depend upon a variety of factors. For example, lens distortion can significantly affect the quality of the digital images. Lens distortion causes straight lines in a scene or object being imaged to appear curved in the image. The most common forms of distortion are radially symmetric, arising from the symmetry of the lens. Radial distortion can be classified as one of two main types: barrel distortion and pincushion distortion. In barrel distortion, image magnification decreases with distance from the optical axis. The effect is an image which appears to have been mapped around a sphere, or barrel. In pincushion distortion, image magnification increases with the distance from the optical axis. The visible effect is that lines that do not go through the center of the image are bowed inwards, toward the center of the image, like a pincushion. Complex distortion, which is a combination of barrel distortion and pincushion distortion, starts out as barrel distortion close to the image center and gradually turns into pincushion distortion toward the image periphery.

In conventional digital imaging systems, the error generated by lens distortion can be corrected by signal processing carried out in an image signal processor (ISP), which is typically formed on a semiconductor chip die. The ISP receives the digital image data from the image sensor, which is also typically formed on a semiconductor chip die. To carry out the correction of the distorted digital image data, a large buffer memory is typically required to store several hundred lines of the distorted image data. The required memory is so large, typically of multiple megabytes, that it cannot be included as part of the ISP chip. As a result, an additional memory chip, typically a dynamic random access memory (DRAM) device, is required. The additional device impacts the size and cost of the overall system. Also, the additional device introduces delays in accessing the memory and memory access bandwidth issues.

SUMMARY

According to one aspect, a method for correcting for distortion in distorted digital data for a distorted image to produce corrected digital data for a corrected image is provided. According to the method, the distorted digital data are partitioned into a plurality of distorted data blocks. Each distorted data block is separately encoded into an encoded distorted data block. A plurality of corrected regions of the corrected image is defined, each corrected region being associated with a respective corrected data block. For each corrected data block, a plurality of associated encoded distorted data blocks is identified, the plurality of associated encoded distorted data blocks is decoded into a respective plurality of associated decoded distorted data blocks, and corrected image data for the corrected data block are generated using the associated decoded distorted data blocks.

According to another aspect, an apparatus for correcting for distortion in distorted digital data for a distorted image to produce corrected digital data for a corrected image is provided. The apparatus includes an encoder for separately encoding each of a plurality of distorted data blocks of partitioned distorted digital data into an encoded distorted data block. A processor defines a plurality of corrected regions of the corrected image, such that each corrected region is associated with a respective corrected data block, for each corrected data block, the processor identifying a plurality of associated encoded distorted data blocks. A decoder decodes the plurality of associated encoded distorted data blocks into a respective plurality of associated decoded distorted data blocks. The processor generates corrected image data for the corrected data block using the associated decoded distorted data blocks.

According to another aspect, an apparatus is provided. The apparatus includes an image sensor and an image signal processor. The image signal processor includes a first encoder for encoding and indexing a real-time distorted image from the image sensor into locatable encoded and indexed blocks of the distorted image. An input bitstream memory stores the locatable encoded and indexed blocks of the distorted image. A decoder decodes the locatable encoded and indexed blocks of the distorted image that are relevant to a block of a corrected image. A local memory stores the decoded blocks of the distorted image. A processor corrects the block of the corrected image using the decoded blocks of the distorted image. A second encoder encodes the corrected block of the corrected image. An output bitstream memory stores the encoded corrected block of the corrected image.

According to another aspect, an image signal processor is provided. The image signal processor includes a first encoder for encoding and indexing a real-time distorted image input into locatable encoded and indexed blocks of the distorted image. An input bitstream memory stores the locatable encoded and indexed blocks of the distorted image. A decoder decodes the locatable encoded and indexed blocks of the distorted image that are relevant to a block of a corrected image. A local memory stores the decoded blocks of the distorted image. A processor corrects the block of the corrected image using the decoded blocks of the distorted image. A second encoder encodes the corrected block of the corrected image. An output bitstream memory stores the encoded corrected block of the corrected image.

BRIEF DESCRIPTION OF THE DRAWINGS

The foregoing and other features and advantages of the disclosure will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the disclosure.

DETAILED DESCRIPTION OF THE PREFERRED EMBODIMENTS

Figure 1:
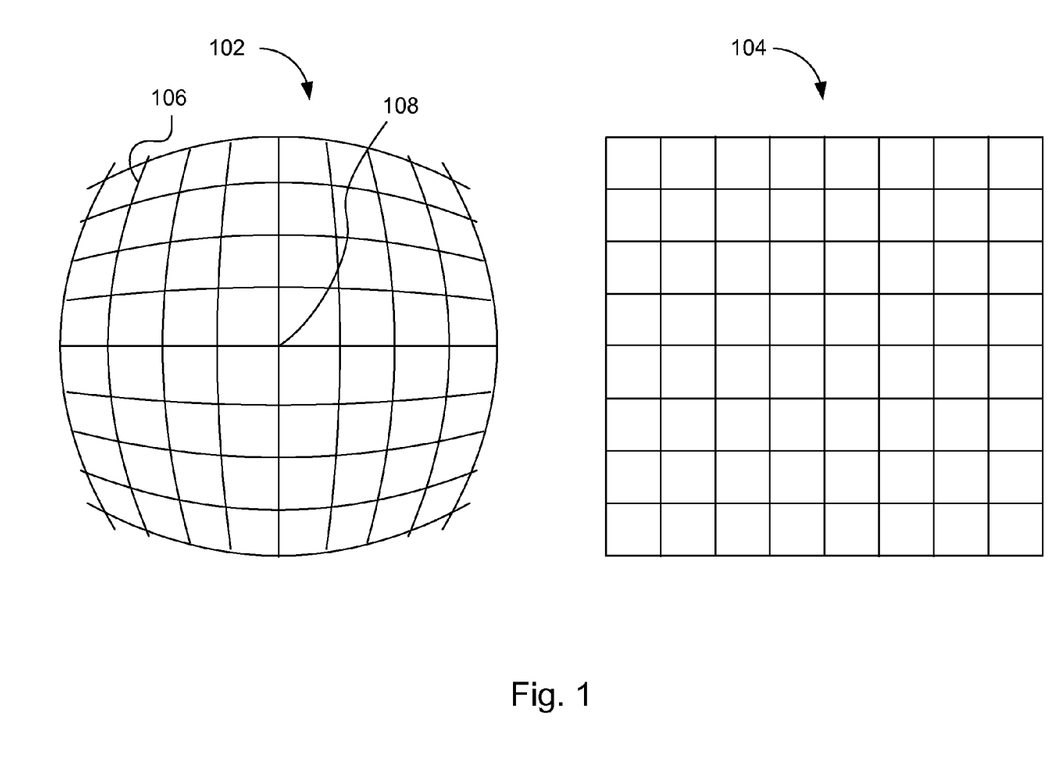
FIG. 1 contains schematic diagrams of a distorted image with barrel distortion caused by lens distortion and a corrected image in which the distortion has been corrected.

FIG. 1 contains schematic diagrams of a distorted image 102 with barrel distortion caused by lens distortion and a corrected image 104 in which the distortion has been corrected. Referring to FIG. 1, the distorted image 102 has distorted lines 106 that are curved away from the optical center 108 of the image 102. As noted above, the exemplary distorted image 102 appears to have a barrel or spherical shape and, therefore, illustrates barrel distortion. Although only barrel distortion is illustrated, it will be understood that this disclosure is also applicable to other types of distortion, such as pincushion distortion in which lines are curved inward toward the optical center, and combinations of barrel and pincushion distortion, i.e., complex distortion. Barrel distortion is typically associated with wide-angle lenses, and pincushion distortion is typically associated with zoom or telephoto lenses.

Figure 2:
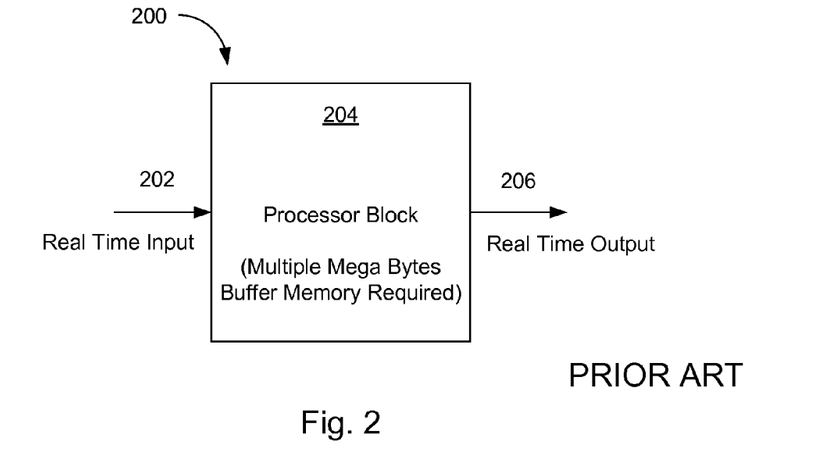
FIG. 2 contains a schematic functional block diagram of a conventional approach to correction of a distorted image.

FIG. 2 contains a schematic functional block diagram of a conventional approach to correction of a distorted image, such as the distorted image 102 illustrated in FIG. 1, to a corrected image, such as the corrected image 104 illustrated in FIG. 1. Referring to FIG. 2, in the system 200, a real-time input 202 provides the distorted image data as they are processed and generated by the digital image sensor. The distorted image data are received by a processor block 204, which corrects the distorted image data, generates corrected image data, and provides the corrected image data at a real-time output 206. The corrected image data can then be further processed such as for display.

Assuming that the coordinate of a pixel in a distorted image is referred to as $(x, y)$, then a plurality of pixels $(x, y)$ are transformed by processor block 204 to coordinates $(x', y')$ in a corrected image. This transformation is performed according to a distortion model that is determined during lens calibration. The distortion model is typically a mathematical function f, such as $(x', y') = f(x, y, c)$, where c denotes distortion parameters that are determined during lens calibration. The mathematical function f may be a polynomial function generated with any known curve fitting routine implemented by any known distortion estimation approach.

In general, the transformation from a plurality of pixels $(x, y)$ to $(x', y')$ is not a one-to-one mapping process. According to the distortion model $(x, y) = f(x, y, c)$, the transformation process may use any number of pixels of the distorted image data. In fact, the transformation process may use all of the pixels or many lines of pixels of the distorted image data to generate the corrected image data $(x', y')$. Typically, the transformation process requires at least many lines of the distorted image data to generate the corrected image data. The actual number of lines of distorted data required is generally determined by the severity of the distortion in the distorted image data. For example, it is not uncommon for hundreds of lines of data, equivalent to multiple Megabytes of data, to be required. These data are required to be stored temporarily or buffered in processor block 204. In some implementations, this demand for storage is so high that an additional memory chip, such as a DRAM chip, is required.

Figure 3:
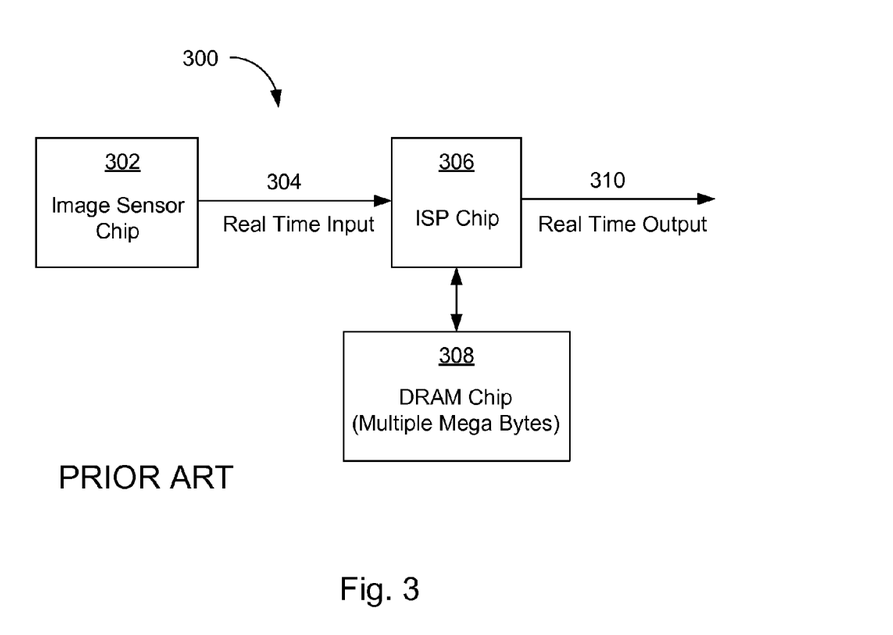
FIG. 3 contains a schematic block diagram of a system implementing a conventional approach to correction of a distorted image.

FIG. 3 contains a schematic block diagram of a system 300 implementing a conventional approach to correction of a distorted image. Referring to FIG. 3, an image sensor chip 302 provides real-time distorted image data input 304 to an image signal processor (ISP) chip 306. A separate DRAM chip 308 is connected to ISP chip 306. DRAM chip 308 buffers or temporarily stores the hundreds of lines of distorted image data input 304 to be used for the transformation to corrected image data. The buffered data are processed in ISP chip 306 by transforming the distorted image data to corrected image data following the distortion model $(x', y') = f(x, y, c)$. ISP chip 306 performs the transformation to provide real-time corrected image data output 310.

Figure 4:
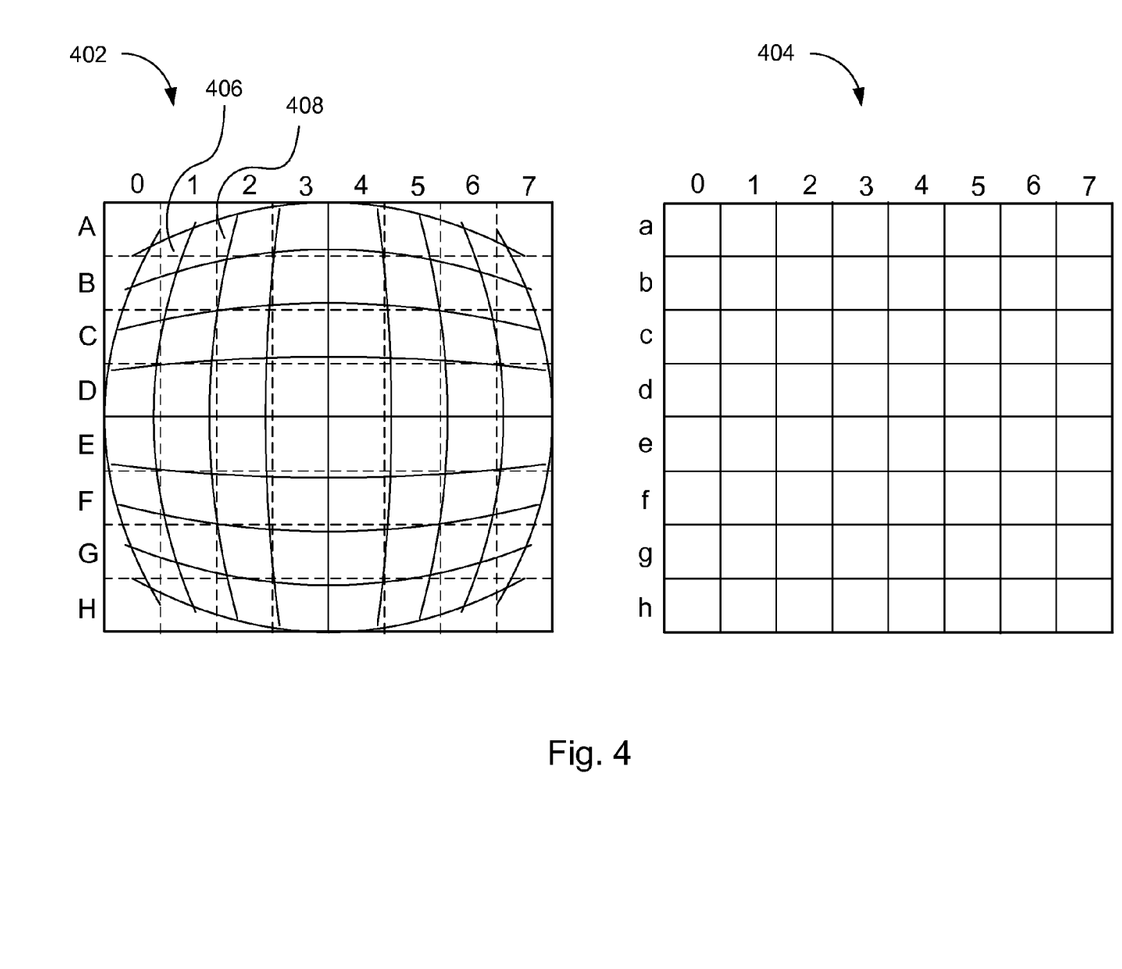
FIG. 4 contains schematic diagrams of a distorted image with barrel distortion caused by lens distortion and a corrected image in which the distortion has been corrected according to exemplary embodiments.

FIG. 4 contains schematic diagrams of a distorted image 402 with barrel distortion caused by lens distortion and a corrected image 404 in which the distortion has been corrected according to exemplary embodiments. The barrel distortion illustrated in FIG. 4 is similar to that illustrated in FIG. 1. As noted above, although distortion is described and illustrated herein as being of the barrel distortion type, it will be understood that the present disclosure is applicable to other forms of distortion, such as pincushion distortion, complex distortion, etc.

Referring to FIG. 4, distorted image 402 can be partitioned into blocks which correspond to associated blocks in corrected image 404. For example, distorted image 402 can be partitioned into blocks A0, A1, . . . , A7, B0, B1, . . . , B7. Corrected image 404 can also be partitioned into blocks, for example, a0, a1, . . . , a7, b0, b1, . . . , b7. It will be understood that the eight-by-eight block partitioning illustrated in FIG. 4 is exemplary only. Any number of partitioned blocks can be used according to the present disclosure.

As shown in FIG. 4, distorted image 402 also includes regions, in this exemplary embodiment, eight-by-eight or 64 regions, which correspond to associated blocks of corrected image 404. For example, region 406 of distorted image 402 corresponds to block a0 of corrected image 404; region 408 of distorted image 402 corresponds to block a1 of corrected image 404, etc. That is, according to exemplary embodiments, distorted region 406 is corrected to corrected block a0, distorted region 408 is corrected to corrected block a1, etc. According to exemplary embodiments, the entirety of corrected image 404 is obtained after all blocks a0, a1, . . . , a7, b0, b1, . . . , b7 are corrected separately, block-by-block, from their associated corresponding distorted regions of distorted image 402.

As noted above, each corrected block of corrected image 404 is generated from an associated distorted region of distorted image 402. According to exemplary embodiments, each distorted region is associated with one or more blocks of distorted image 402. For example, corrected block a0 is associated with distorted region 406, as noted above. Distorted region 406 is associated with distorted blocks A0, A1, B0, and B1. To generate corrected block a0 in corrected image 404, according to exemplary embodiments, distorted region 406 of distorted image 402 is transformed according to the correction transformation model (x', y')=f(x, y, c). Since only blocks A0, A1, B0, and B1 of distorted image 402 are relevant to corrected block a0 of corrected image 404, only data from these blocks of distorted image 402 are used to generate corrected block a0 in corrected image 404. Since, according to the exemplary embodiments, only this relatively small amount of data is used for correction of each individual block, then only enough memory to store this amount of data is required. As a result, no additional memory device, such as an additional DRAM device, is required.

Figure 5:
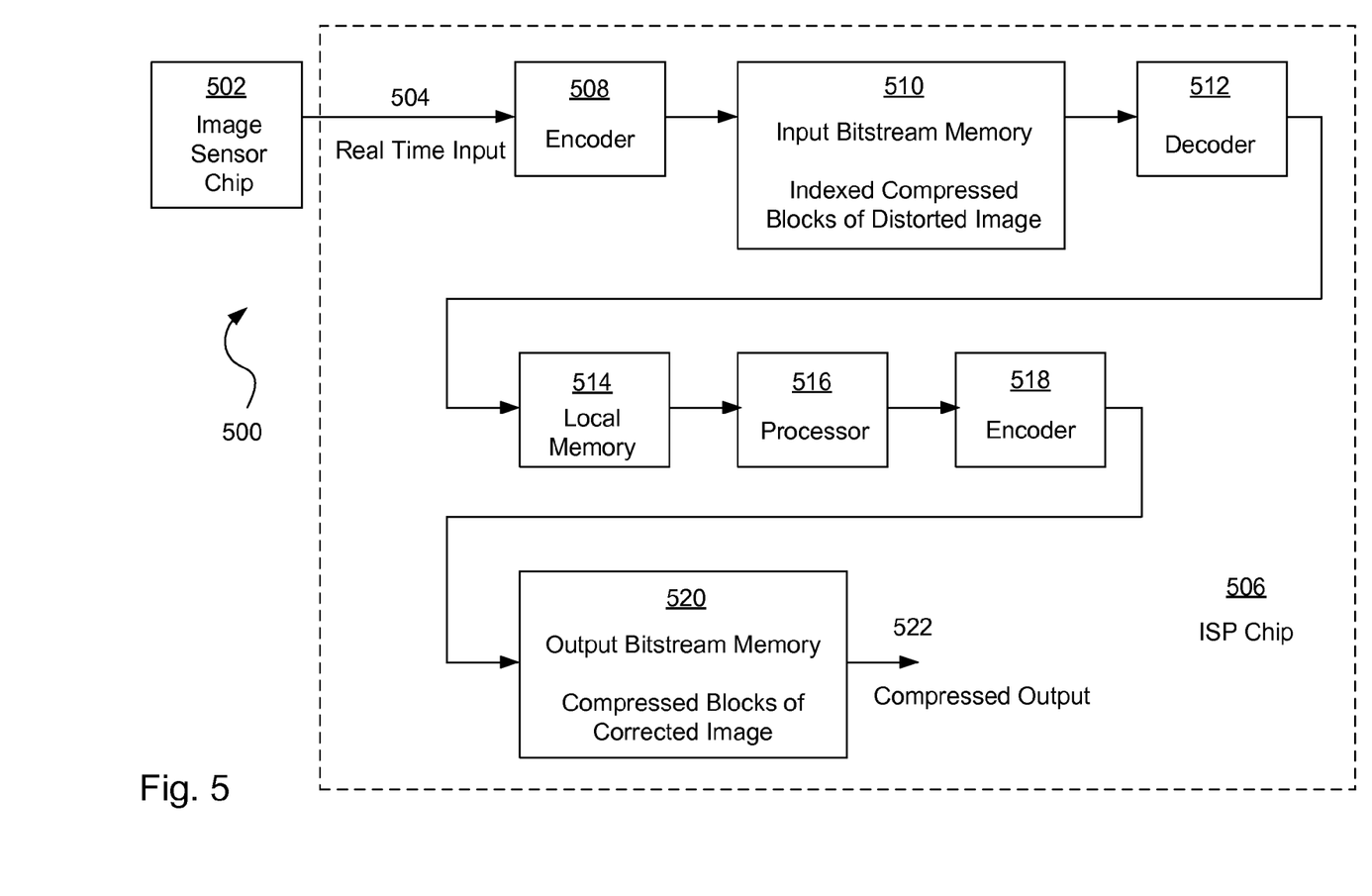
FIG. 5 contains a schematic functional block diagram of a system for correcting image distortion as illustrated in FIG. 4, according to exemplary embodiments.

FIG. 5 contains a schematic functional block diagram of a system 500 for correcting image distortion as illustrated in FIG. 4, according to exemplary embodiments. Referring to FIG. 5, an image sensor chip 502 provides real-time distorted image input data 504. Real-time distorted image input data 504 is compressed or encoded by an encoder 508, using some known data compression approach, which can be either a lossy data compression or lossless data compression. This data compression is carried out by encoder 508 block-by-block of real-time distorted image input data 504. That is, the distorted data for block A0 is encoded, then the distorted data for block A1 is encoded, then block A2 is encoded, etc., until all of the blocks of data for distorted image 402 are encoded. It should be noted that throughout this disclosure, data encoding and data compression are considered synonymous and are used interchangeably. All of the encoded/compressed blocks are indexed with location indices and are stored in an input bitstream memory 510. That is, input bitstream memory 510 stores independently locatable indexed compressed blocks A0, A1, . . . , A7, B0, B1, . . . , B7. Because of the indexing of the blocks with location indices, each block stored in input bitstream memory 510 can be independently located. Since all blocks are compressed using either a lossless or lossy compression approach, input bitstream memory 510 may be relatively small in terms of data storage capacity, for example, only several hundred kilobytes. Thus, input bitstream memory 510 can be included as part of an image signal processor (ISP) chip 506 and need not be a separate device.

When block a0, for example, is corrected, a decoder 512 receives compressed blocks A0, A1, B0, and B1 from input bitstream memory 510 and decodes the received blocks. The decoded/decompressed data of only blocks A0, A1, B0, and B1 are temporarily stored in a local memory 514. It should be noted that throughout this disclosure, data decoding and data decompression are considered synonymous and are used interchangeably. Since only a small number of blocks are decoded and stored, local memory 514 can be relatively small, for example, only several kilobytes in size. Therefore, local memory 514 can be included in ISP chip 506 and need not be a separate device. A processor 516 receives the decompressed data blocks A0, A1, B0, and B1 and transforms them into decompressed corrected block a0 in corrected image 404. The decompressed corrected block a0 is then compressed by an encoder 518, which uses either lossless or lossy data compression, and the compressed data for corrected block a0 is stored in an output bitstream memory 520. Because only compressed data are stored in output bitstream memory 520, memory 520 can be relatively small, for example, on the order of several hundred kilobytes, and, therefore, can be included in ISP chip 506 and need not be a separate device. A compressed corrected output 522 can be provided from output bitstream memory 520 and output from ISP chip 506.

Thus, according to exemplary embodiments, encoder 508, input bitstream memory 510, decoder 512, local memory 514, processor 516, encoder 518 and output bitstream memory 520 can all be included in the ISP chip 506, and separate memory devices or other devices are not required. As a result, significant size and cost reduction are realized.

During the correction of subsequent blocks, i.e., blocks a1, a2, etc., further significant reduction in processing and storage requirements are realized, according to exemplary embodiments. For example, when corrected block a1 is generated, decoded/decompressed data of blocks A1, A2, B1, and B2 are required. However, because corrected block a0 was previously generated, distorted blocks A1 and B1 remain temporarily stored in local memory 514. Therefore, only distorted blocks A2 and B2 need be located and decoded and stored in local memory 514. Processor 516 transforms decompressed data of blocks A1, A2, B1, and B2 into decompressed corrected block a1 in corrected image 404. The decompressed corrected block a1 is then compressed by encoder 518, and the compressed corrected block a1 is stored in output bitstream memory 520 with corrected block a0. The remaining blocks are corrected in similar fashion, until all blocks in corrected image 404 are corrected and stored in output bitstream memory 520.

Figure 6:
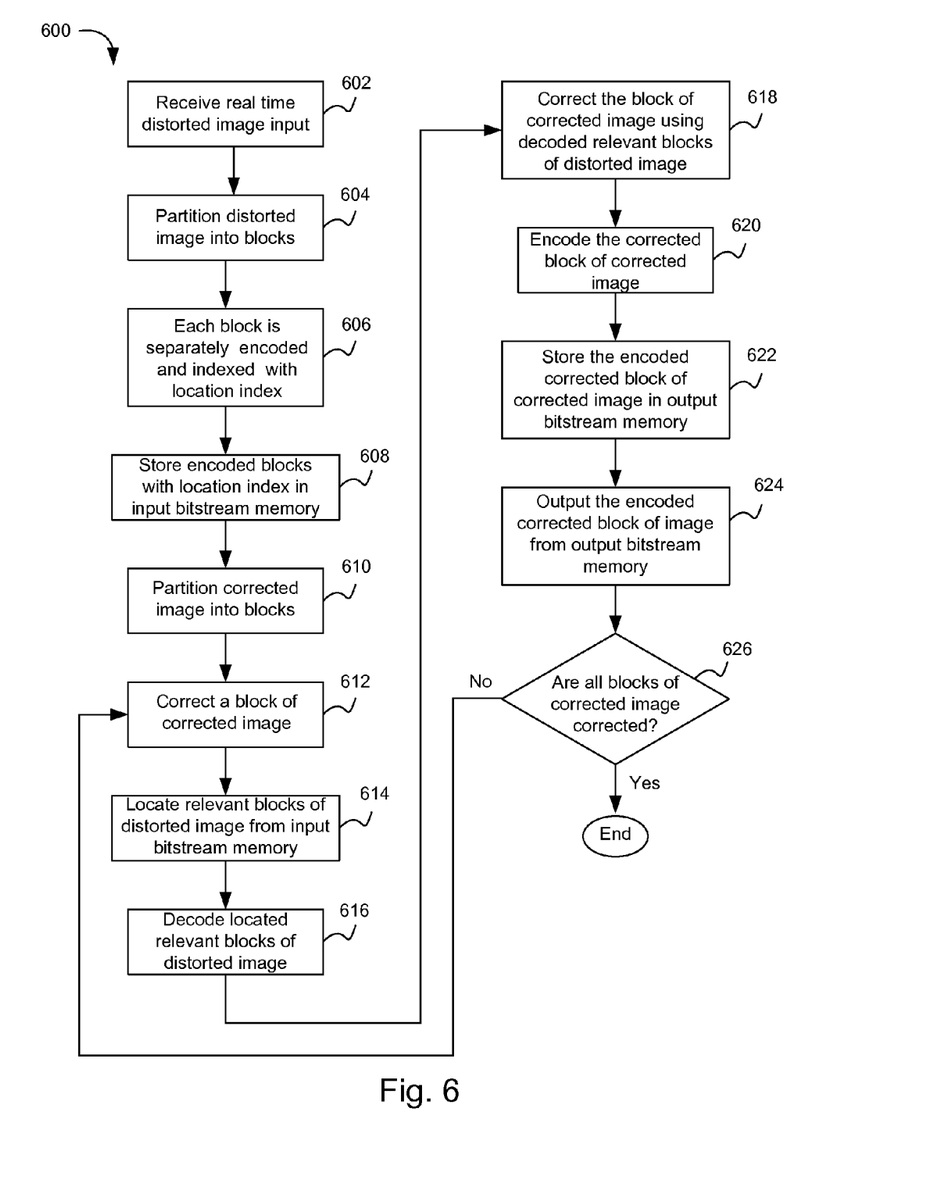
FIG. 6 contains a schematic logical flow diagram illustrating steps in a process for correcting lens distortion, according to exemplary embodiments.

FIG. 6 contains a schematic logical flow diagram illustrating steps in a process 600 for correcting distortion, according to exemplary embodiments. Referring to FIGS. 4 through 6, in step 602, real-time distorted image input 504 is received. Next, in step 604, the distorted image data is partitioned into blocks. For example, distorted image 402 is partitioned into blocks A0, A1, . . . , A7, B0, B1, . . . , B7. Next, in step 606 each block of distorted image data, e.g., each block A0, A1, . . . , A7, B0, B1, . . . , B7, is separately encoded and indexed with a location index. Next, in step 608, the encoded and indexed blocks of distorted image data are stored with location indices in input bitstream memory 510. Next, in step 610, corrected image 404 is partitioned into blocks, e.g., blocks a0, a1, . . . , a7, b0, b1, . . . , b7. Next, beginning at step 612 and continuing through step 624, a block of corrected image 404 is corrected. Specifically, in step 614, relevant blocks of distorted image 402 for the block of corrected image 404 to be corrected are identified and located in input bitstream memory 510. Then, in step 616, the located relevant blocks of distorted image 402 are decoded in decoder 512. Then, in step 618, the block of corrected image 404 is corrected in processor 516 using the decoded relevant blocks of distorted image 402. Then, in step 620, the corrected block of corrected image 404 is encoded in encoder 518. Then, in step 622, the encoded corrected block of corrected image 404 is stored in output bitstream memory 520. Then, in step 624, the encoded corrected block is output from output bitstream memory 520. Next, in decision step 626, a determination is made as to whether all blocks of corrected image 404 have been generated. If not, then flow returns to steps 612 through 624, where another block of corrected image 404 is generated as described above. If it is determined in decision step 626 that all blocks of corrected image 404 have been generated, then the process ends. Although not shown in FIG. 6, the order of steps 624 and 626 may be reversed.

Combinations of Features

Various features and aspects have been described above in detail. This description covers any and all combinations of any number of the features and aspects described herein, unless the description specifically excludes a combination of features. The following examples illustrate some of the combinations of features contemplated and described herein in detail in accordance with this disclosure.

In any of the embodiments described in detail and/or claimed herein, the apparatus may further comprise: a second encoder, the second encoder, for each corrected data block, encoding the corrected image data for the corrected data block to generate encoded corrected image data for the corrected data block; and an output bitstream memory, the output bitstream memory storing the encoded corrected image data for the corrected data block.

In any of the embodiments described in detail and/or claimed herein, the apparatus may further comprise an input bitstream memory, the input bitstream memory storing each indexed encoded distorted data block.

In any of the embodiments described in detail and/or claimed herein, two corrected data blocks can be associated with at least one common associated encoded distorted data block.

In any of the embodiments described in detail and/or claimed herein, the image sensor is formed on an image sensor chip.

In any of the embodiments described in detail and/or claimed herein, the image signal processor is formed on an image signal processor chip.

While the present disclosure has shown and described exemplary embodiments, it will be understood by those of ordinary skill in the art that various changes in form and details may be made therein without departing from the spirit and scope of the present disclosure, as defined by the following claims.

We claim:

1. A method for correcting for distortion in distorted digital data for a distorted image to produce corrected digital data for a corrected image, comprising:
   (A) partitioning the distorted digital data into a plurality of distorted data blocks;
   (B) separately encoding each distorted data block into an encoded distorted data block, the step of separately encoding consisting of:
      separately encoding each of the distorted data blocks via a lossless or lossy data compression, and
      indexing the encoded distorted data blocks for storing in an input bitstream memory;
   (C) identifying a first plurality of associated encoded distorted data blocks associated with a first corrected data block;
   (D) decoding only the first plurality of associated encoded distorted data blocks into a first set of associated decoded distorted data blocks;
   (E) generating corrected image data for the first corrected data block using the first set of associated decoded distorted data blocks;
   (F) identifying a second plurality of associated encoded distorted data blocks associated with a second corrected data block;
   (G) decoding only the second plurality of associated encoded distorted data blocks into a second set of associated decoded distorted data blocks;
   (H) generating corrected image data for the second corrected data block using the second set of associated decoded distorted data blocks and at least a portion of the first set of associated decoded distorted data blocks such that at least two of the plurality of corrected data blocks are associated with at least one common associated encoded distorted data block;
   wherein steps (G) and (H) do not occur until after step (D).

2. The method of claim 1, further comprising, for each corrected data block, encoding the corrected image data for the corrected data block to generate encoded corrected image data for the corrected data block, and storing the encoded corrected image data for the corrected data block in an output bitstream memory.

3. The method of claim 2, further comprising outputting the encoded corrected image data for the corrected data block from the output bitstream memory.

4. The method of claim 1, further comprising storing the indexed encoded distorted data blocks in an input bitstream memory.

5. An apparatus for correcting for distortion in distorted digital data for a distorted image to produce corrected digital data for a corrected image, comprising:
   an image signal processor having
      an encoder for separately encoding each of a plurality of distorted data blocks of partitioned distorted digital data into a respective encoded distorted data block, the encoded distorted data blocks being encoded in a lossy or lossless data compression and having indices for storing in an input bitstream memory according to an index and without further operation thereon;
   a processor configured for
      (A) defining a plurality of distorted regions of the distorted image, such that each distorted region is associated with at least one respective corrected data block of the corrected digital data,
      (B) for each of a first and second corrected data block, the processor identifying a respective first and second plurality of associated encoded distorted data blocks associated with the first and second corrected data blocks; and
   a decoder for decoding
      the first plurality of associated encoded distorted data blocks into a first set of associated decoded distorted data blocks, and
      the second plurality of associated encoded distorted data blocks into a second set of associated decoded distorted data blocks;
   wherein the processor is further configured to
      generate corrected image data for the first corrected data block using the first set of associated decoded distorted data blocks, and
      generate corrected image data for the second corrected data block using the second set of associated decoded distorted data blocks and at least a portion of the first set of associated decoded distorted data blocks such that at least two corrected data blocks are associated with at least one common associated encoded distorted data block, and
   wherein the decoder decodes the second set of associated decoded distorted data blocks after the corrected image data for the first corrected data block is generated.

6. The apparatus of claim 5, the image signal processor further having:
   a second encoder, the second encoder, for each corrected data block, encoding the corrected image data for the corrected data block to generate encoded corrected image data for the corrected data block; and
   an output bitstream memory, the output bitstream memory storing the encoded corrected image data for the corrected data block.

7. The apparatus of claim 5, the input bitstream memory storing each encoded distorted data block according to the index.

8. An apparatus, comprising:
   an image sensor; and
   an image signal processor, comprising:

a first encoder configured only for encoding and indexing a real-time distorted image from the image sensor into locatable encoded and indexed blocks of the distorted image;

an input bitstream memory for storing the locatable encoded and indexed blocks of the distorted image;

a decoder for decoding a first set of associated encoded and indexed blocks of the locatable encoded and indexed blocks of the distorted image into a first set of decoded blocks of the distorted image, the first set of associated encoded and indexed blocks being associated to a first block of a corrected image, and a second set of associated encoded and indexed blocks of the locatable encoded and indexed blocks of distorted image into a second set of decoded blocks of the distorted image, the second set of associated encoded and indexed blocks being associated to a second block of the corrected image;

a local memory for storing the sets of decoded blocks of the distorted image;

a processor configured for correcting the first block of the corrected image using the first set of decoded blocks of the distorted image, wherein the first set of decoded blocks of the distorted image remain stored within the local memory, and correcting the second block of the corrected image, after the first block, using the second set of decoded blocks of the distorted image and at least a portion of the first set of decoded blocks of the distorted image, wherein the second set of decoded blocks is stored in the local memory after the processor corrects the first block of the corrected image;

a second encoder for encoding the corrected blocks of the corrected image; and an output bitstream memory for storing the encoded corrected blocks of the corrected image.

9. The apparatus of claim 8, wherein the image sensor is formed on an image sensor chip.

10. The apparatus of claim 8, wherein the image signal processor is formed on an image signal processor chip.

11. An image signal processor, comprising:

a first encoder configured only for encoding and indexing a real-time distorted image input into locatable encoded and indexed blocks of the distorted image;

an input bitstream memory for storing the locatable encoded and indexed blocks of the distorted image;

a decoder for decoding a first set of associated encoded and indexed blocks of the locatable encoded and indexed blocks of the distorted image into a first set of decoded blocks of the distorted image, the first set of associated encoded and indexed blocks being associated to a first block of the corrected image, and a second set of associated encoded and indexed blocks of the locatable encoded and indexed blocks of distorted image into a second set of decoded blocks of the distorted image, the second set of associated encoded and indexed blocks being associated to a second block of the corrected image;

a local memory for storing the sets of decoded blocks of the distorted image;

a processor configured for correcting the first block of the corrected image using the first set of decoded blocks of the distorted image, wherein the first set of decoded blocks of the distorted image remain stored within the local memory, and correcting the second block of the corrected image, after the first block, using the second set of decoded blocks of the distorted image and at least a portion of the first set of decoded blocks of the distorted image;

a second encoder for encoding the corrected block of the corrected image; and an output bitstream memory for storing the encoded corrected block of the corrected image wherein the second set of decoded blocks are stored within the local memory after the processor corrects the first block of the corrected image.

12. The image signal processor of claim 11, wherein the image signal processor is formed on an image signal processor chip.

* * * * *